E. R. BENSON AND M. S. CRANDALL.
VEHICLE DUMP.
APPLICATION FILED NOV. 15, 1919.

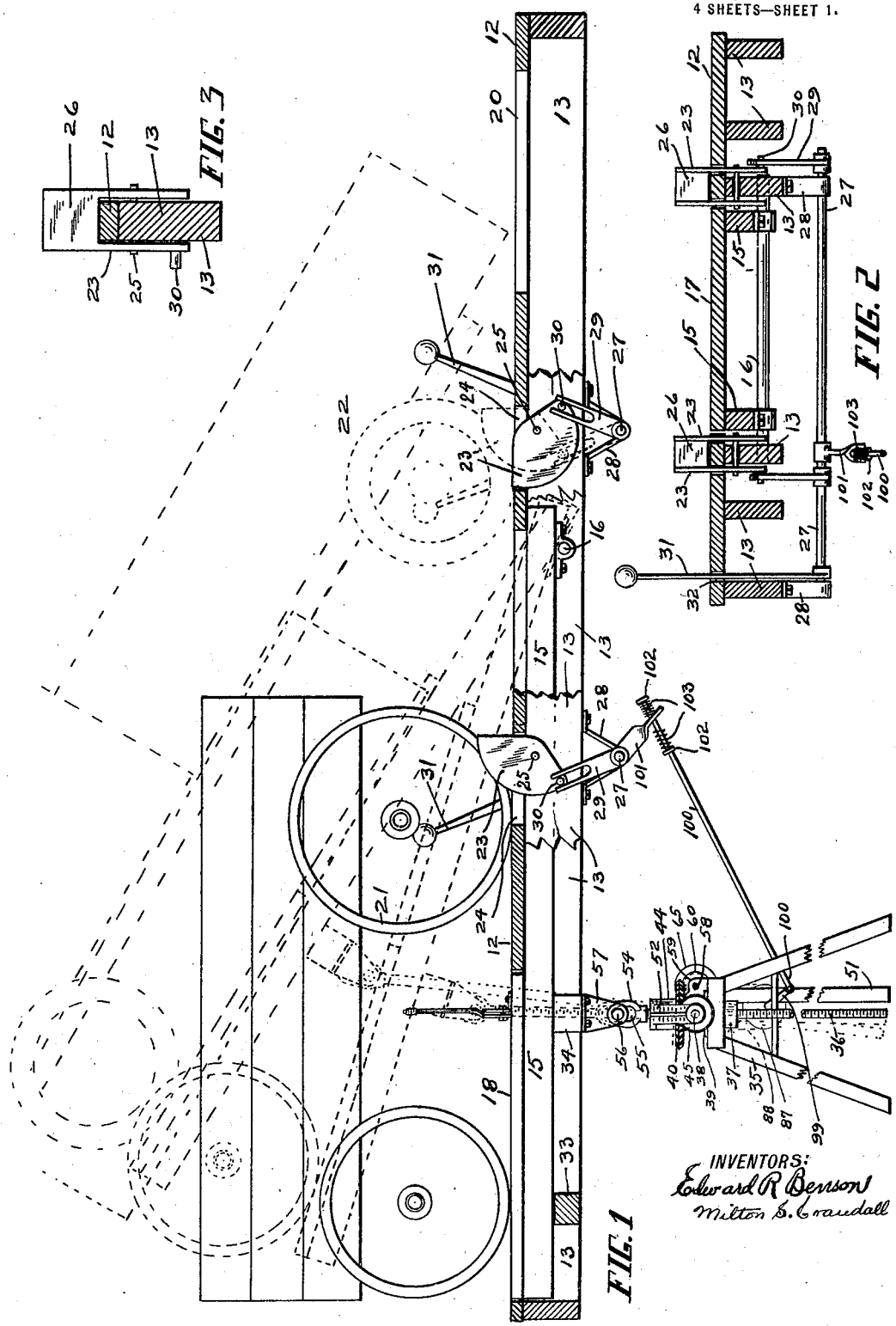

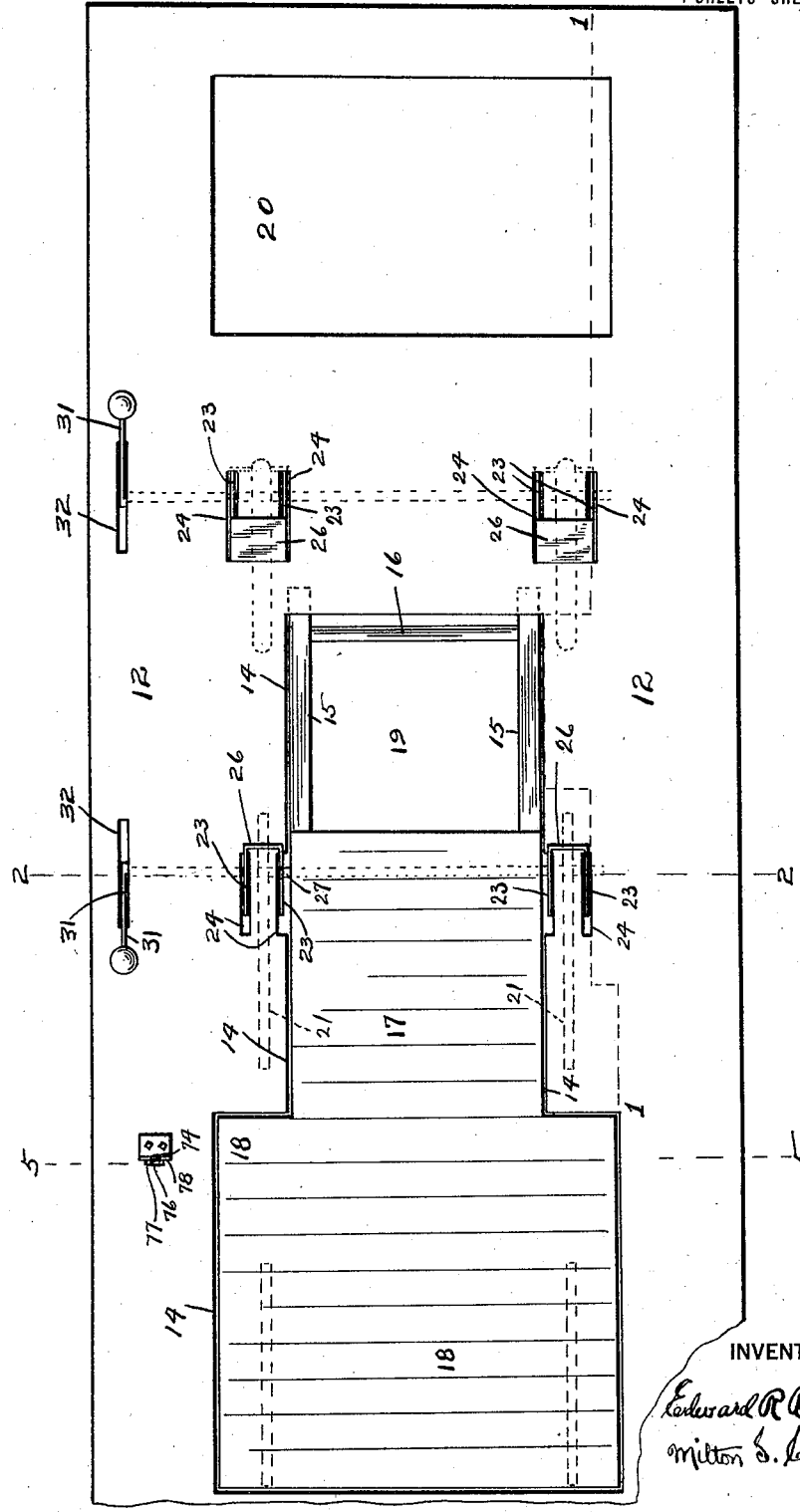

1,387,036.

Patented Aug. 9, 1921.
4 SHEETS—SHEET 3.

INVENTORS:
Edward R. Benson
Milton S. Crandall

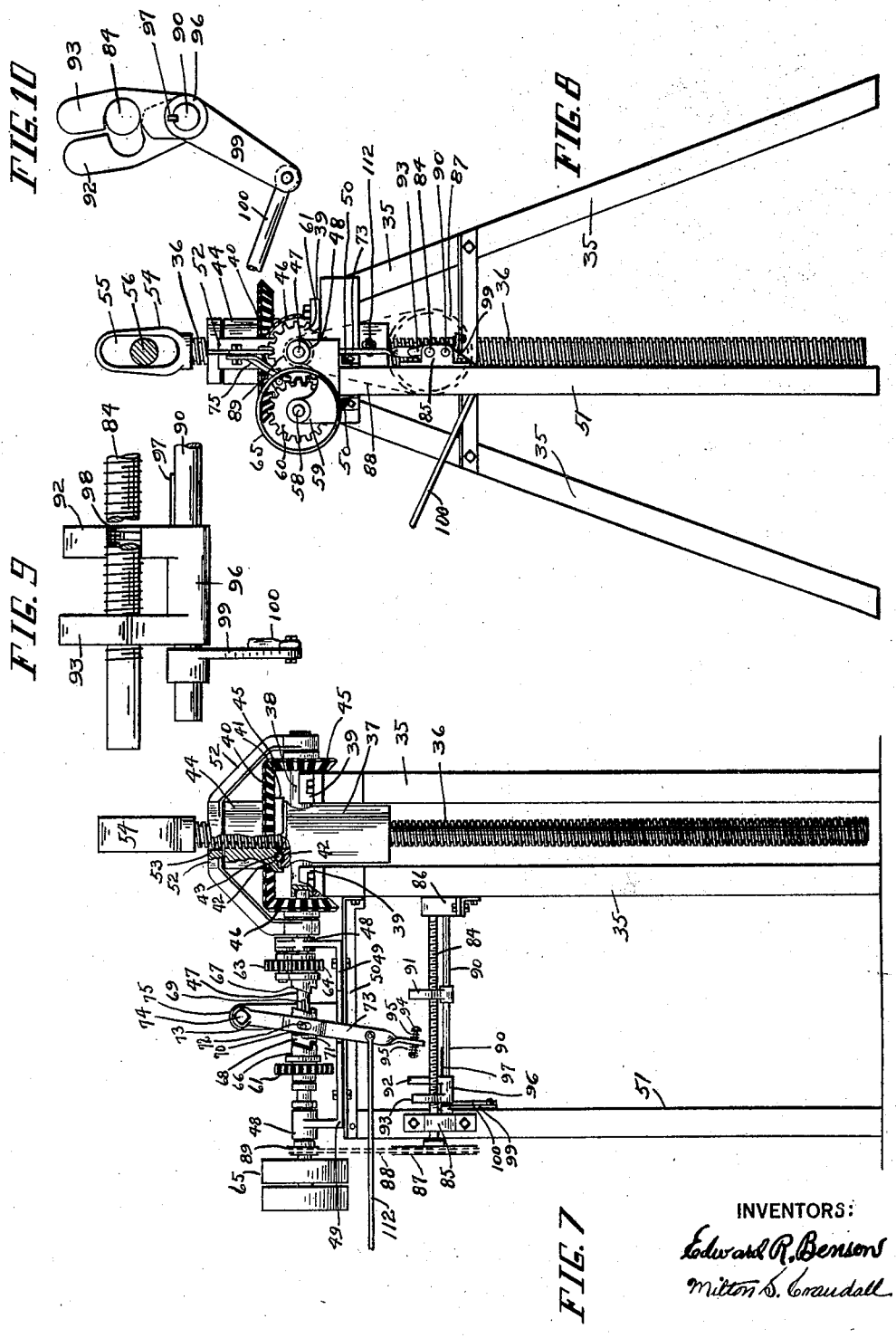

UNITED STATES PATENT OFFICE.

EDWARD R. BENSON, OF MINNEAPOLIS, MINNESOTA, AND MILTON S. CRANDALL, OF SIOUX CITY, IOWA.

VEHICLE-DUMP.

1,387,036. Specification of Letters Patent. Patented Aug. 9, 1921.

Application filed November 15, 1919. Serial No. 338,407.

*To all whom it may concern:*

Be it known that we, EDWARD R. BENSON and MILTON S. CRANDALL, citizens of the United States, and residents, respectively, of Minneapolis, in the county of Hennepin and State of Minnesota, and of Sioux City, in the county of Woodbury and State of Iowa, have invented certain new and useful Improvements in Vehicle-Dumps, of which the following is a specification.

The invention has for its primary object the production of improved actuating means for vehicle-dumps.

A further object of the invention is the production of an improved mechanism operable to actuate tilting vehicle-dumping means and embodying certain novel features and appurtenances adapted to automatically deënergize the mechanism at predetermined positions of the tilting means.

Furthermore the invention contemplates in a vehicle dump embodying tilting vehicle supporting means adapted to be tilted to different positions to dump relatively long and short vehicles, an actuating mechanism operable to tilt the said means to such positions and embodying devices for automatically deënergizing the mechanism when said means have been tilted to a preselected one of such positions and to automatically deënergize the mechanism when said means has reached its normal position.

Still a further object of the invention is the production of a vehicle dump embodying tilting vehicle supporting means, vehicle wheel blocking means movable to and from operative positions, mechanism for actuating the tilting means and means for manually controlling both the wheel blocking means and the actuating mechanism.

Another object of the invention is the production of actuating means for vehicle dumps, positive in operation, requiring but a minimum of power, yet comparatively simple and inexpensive in production.

With these and other objects in view, the invention consisting in the construction, combination and novel arrangement of parts, will be fully understood from the following description, reference being had to the accompanying drawings, which form a part of this application and in which like characters of reference indicate corresponding parts throughout the several views, of which,—

Figure 1 is a vertical section of a vehicle dump constructed in accordance with our invention, taken approximately on the line 1—1 of Fig. 4, parts being cut away;

Fig. 2 is a transverse vertical section of the same taken on the line 2—2 of Fig. 4;

Fig. 3 is a rear elevation of one of the wheel blocking members and associated parts;

Fig. 4 is a plan of the dump, parts being cut away;

Fig. 7 is an enlarged front elevation of the jack, parts being cut away;

Fig. 8 is an enlarged side elevation of the same;

Fig. 9 is a further enlarged front elevation of the traveling gear shifting members and associated parts, a part being cut away;

Fig. 10 is a side elevation of the same and;

Figure 11:
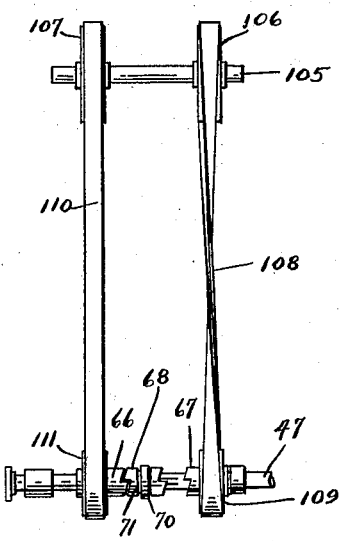
Fig. 11 is a plan of a modification of the power transmission.

While we have illustrated and described a preferred embodiment suitable for practising the invention, we would not be understood as being limited to the specific structure shown in the illustration, for various alterations and modifications may be made in the construction and arrangement of parts without departing from the spirit and scope of the invention as defined in the appended claims.

Referring now, more particularly, to Sheets 1, 2 and 3 of the drawings, the platform shown may be a scales platform or a fixed platform and includes a suitable flooring, 12, carried by supporting beams, 13, the flooring is provided with an opening, 14, in which is mounted a movable platform consisting of a pair of beams, 15, extending longitudinally of the platform positioned adjacent the respective sides of the opening, 14, and having their rear ends pivoted as at 16 to the beams, 13, the beams, 15, are relatively so positioned as to permit the usual wagon to be driven upon the platform, 12 and straddle the beams, which, 15 are interconnected by a supporting flooring, 17. The sides of the front end portion of which flooring are offset outwardly as at, 18, which portion is somewhat broader than the tread of a vehicle and serves as a support for the front wheels of either wagons or motor trucks. Obviously, the front end portion of the opening, 14, is enlarged to receive the tilting platform portion, 18. The rear end portion of the flooring, 17, is provided with an opening, 19, through which grain from wagons is dumped and the extreme rear portion of the platform, 12, is provided with an opening, 20, to receive the contents of longer vehicles, as motor trucks. Obviously, the openings, 19 and 20, may be normally covered with the usual doors or provided with grating, now common in the art.

Vehicles to be dumped are driven upon the platform as usual and whether it is a wagon or a motor truck, the front wheels of the vehicle are positioned upon the tilting platform portion, 18, adjacent the front end thereof. If the vehicle is a wagon, as illustrated in Figs. 1 and 4, the rear wheels, 21, thereof are positioned upon the flooring, 12, just in the rear of the offset portion of the tilting platform. The rear wheels of a motor truck are represented by dotted lines, 22, in Fig. 1, upon the platform, 12, in the rear of the pivotal point of the tilting platform.

It has been found that to dump all kinds and conditions of small grain, it is necessary to tilt the vehicles to approximately 30 degrees. Thus it will be seen, that in tilting the long and short vehicles to the proper angle to facilitate gravitation of the grain, the tilting platform must be raised somewhat higher to dump a truck than a wagon.

To prevent rearward movement of the wagons or trucks, we provide wheel blocking devices adapted to be instantly thrown to and from operative positions. In the present embodiment these wheel blocking members each include side plates, 23, positioned in slots, 24, in the flooring, 12, and disposed on opposite sides of platform beams, 13, and suitably pivoted to the beam, as at 25. The rear edges of the plates above the flooring are interconnected by cross plates, 26, which normally or when the stops are in inoperative position, rest flat upon the flooring and offer no obstruction to a vehicle. When shifted to operative positions, the cross plates, 26, are positioned vertically and the lower edges engage the floor whereby rearward movement of the vehicle wheels is prevented when engaged by the upper edges of the plates, 26. Associated with the respective pairs of wheel stops, are rock-shafts, 27 positioned below and transversely of the platform and journaled in suitable bearings, 28, on the platform beams, 13. The said rock-shafts carry arms, 29, bifurcated to receive pins, 30, on the lower ends of the stop plates, 23. The rock-shafts are controlled by levers, 31, fixed to the respective shafts and free to oscillate in slots, 32, in flooring, 12. Thus it is clear either pair of stops may be instantly thrown to and from operative positions by means of the levers, 31.

The front end portion of the tilting platform rests normally on a fixed beam, 33, and the intermediate portions of the beams, 15, are interconnected by a cross member, 34.

Below the cross member, 34, is positioned the actuating means of jack which preferably includes two supporting side frames, 35, between which is interposed a threaded shaft, 36, freely encircled by a sleeve, 37, formed with trunnions, 38, journaled in bearings, 39, on the tops of said frame members. Positioned above the sleeve is a bevel gear, 40, having a short hub, 41, on its under side, which rests upon the sleeve, 37. The co-acting faces of the hub and sleeve are preferably provided with annular ball races, 42, in which are positioned ball bearings, 43. The upper face of the bevel gear, 40, is formed with a hub, 44, threaded on the shaft, 36. At one side the bevel gear is intermeshed within an idler bevel pinion, 45, mounted coaxially with the adjacent trunnion 38, and at its opposite side the bevel gear, 40, is driven by a bevel pinion, 46, mounted coaxially with the adjacent trunnion and fixed on a shaft, 47, mounted in bearings, 48, formed on a supporting base plate, 49, carried by parallel cross members, 50, secured at one end of the adjacent frame, 35, and at the other to a supporting upright, 51. Disengagement of the gear, 40, from the pinions is prevented by means of a yoke, 52, the web of which is positioned above the hub, 44, and is provided with a bore, 53, to freely inclose the jack shaft, 36, and the arms of the yoke are pivoted coaxially with the trunnions, 38. The upper end of the jack shaft is provided with a head, 54, having a vertical slot, 55, to freely inclose a wrist pin, 56. The head is positioned between suitable bearings, 57, depending from the tilting frame member, 34, and in which bearings the wrist pin, 56, is carried. It is now evident that rotation of the gear, 40, will raise the tilting platform or permit the same to lower according to the direction of rotation. In normal position the wrist pin, 56, is either at the top of the slot of the head of the jack shaft or a distance from the bottom of the slot to permit unobstructed operation of the scales platform. The drive pinion, 46, is actuated by a power transmission which preferably includes a horizontal main shaft, 58, and disposed in parallelism with the shaft, 47, which serves as the counter shaft. The main shaft, 58, is journaled in bearings, 59, formed on the base, 49. The main shaft carries a fixed spur-gear, 60, intermeshed with a similar gear, 61, free to rotate upon the counter shaft; and a relatively smaller spur gear, 62, also fixed upon the main shaft and intermeshed with an idler gear, 63, driving a spur gear, 64, free on the counter shaft, 47. The main shaft, 58, is provided with a drive pulley, 65, which may be actuated from any suitable source of power. The adjacent faces of the gears 61 and 64, carry clutch members, 66 and 67, respectively, between which is a clutch member, 68, slidable longitudinally of the shaft, 47, or a key or feather, 69, and engageable and disengageable with and from either of the clutch members, 66 and 67. As the gears, 61 and 64, are driven in opposite directions upon the shaft, 47, it is clear that the shaft, 47, may be driven in either direction according as to which of the clutch members, 66 or 67, is engaged by the clutch member, 68. The sliding clutch member is operated by means of a collar, 70, freely encircling the clutch member, 68, within an annular groove 71, and having pivoted thereto, as at 72, an oscillating lever, 73, fulcrumed as at 74, on a suitable bearing, 75, on the base, 49. The said lever is controlled by a hand lever, 76, depending through a slot, 77, in the flooring, 12, and fulcrumed on a suitable quadrant, 78, engageable by a pawl, 79, on the hand lever. The lower end of the hand lever is slidably pivoted as at 80, to the upper end of a second lever, 81, fulcrumed as at 82, to a suitable hanger, 83, on the platform; and interconnected by a rod, 112, with the lever, 73. It is now clear that with the power transmission actuated, the hand lever, 76, may be thrown in one direction to cause the jack to raise the platform and shifted oppositely to reverse the transmission to permit reciprocation of the platform; however to prevent accident, which might occur should the tilting platform be raised too high or should the mechanism not be deënergized when the tilting platform has been restored to normal, we provide means for automatically deënergizing the transmission by throwing the clutch member, 68, into its neutral position disengaged from both clutch members, 66 and 67, when the platform has reached a chosen inclined position or its normal horizontal position, the said means being governed preferably by the position of the wagon wheel stops, 23. For this purpose we provide a threaded shaft, 84, positioned below the power transmission and journaled in suitable bearings, 85 and 86, mounted, respectively on the supporting upright, 51, and the adjacent supporting frame, 35. Said shaft carries a sprocket wheel, 87, connected by a sprocket chain, 88, with a relatively smaller sprocket wheel 89, mounted on the counter shaft, 47, whereby the counter shaft imparts rotation to the shaft, 84. Positioned below the shaft, 84, is a rod, 90, supported by the bearings, 85 and 86. Upon the rod, 90, are slidably mounted upright arms, 91, 92 and 93. The arm, 91, being threaded upon the shaft, 84, and positioned on the opposite side of the lever, 73, from its companions. The said arms, 92 and 93, are disposed in different radial planes and different planes transversely of the threaded shaft and either arm may be placed in threaded engagement with the shaft, 84, as will later be made more clear. As the lower end of the lever, 73, is positioned in the path of the arm, 91, and one of the arms, 92 or 93, it is evident that as the arms travel along the shaft, 84, as the latter is rotated, the lever will be engaged and shifted to neutral by one of the arms according to the direction of movement of the arms.

Inasmuch as the shifting arms are actuated by means driven from the counter shaft, the instant the co-acting clutch members are barely disengaged, operation of the counter shaft and shifting arms ceases. Therefore in order that the shifting lever, 73, shall with certainty be restored to its neutral position, we extend through the lever, 73, a bolt, 94, slidable freely through the lever and provided on its ends with bosses between which and the lever are interposed compression springs, 95, which tend to hold the heads of the bolts equal distances from the lever, thus providing yielding contacts between the lever and shifting arms which gather sufficient power when engaged by the arms to continue the movement of the lever to its neutral position as the co-acting clutch members have been disengaged.

Referring now, more particularly, to Figs. 9 and 10, the shifting arms, 92 and 93 are preferably formed integrally with a collar, 96, slidable on the shaft, 90, on a key or feather, 97, and as previously stated, the said arms are positioned in different radial planes and different planes transversely of the shaft. The adjacent edges of the arms are provided with arched notches, 98, positioned and threaded for engagement with the shaft, 84, whereby either arm may be placed in engagement with the shaft, 84, by rocking the guide shaft, 90, which is preferably controlled by means of a crank arm, 99, on the shaft, 90, and connected with one end of a rod, 100, the opposite end portion of which passes freely through a crank arm, 101, carried by a rock-shaft, 27, controlling the wagon wheel stops. On opposite sides of the crank arm, 101, the rod, 100, is provided with bosses, 102, between which and the crank arm, 101, are interposed yieldable means as the coil springs, 103. By shifting the wagon wheel stop controlling lever, 31, in opposite directions, the shifting arms, 92 and 93, will alternately engage the shaft, 84, the compression springs, 103, serving relatively to hold the arms in firm yet yieldable engagement with the shaft. The shaft, 84, is so threaded and timed with respect to the counter shaft, 47, and the shifting arms, 91, 92 and 93 are so related that when the tilting platform has reached the proper pitch, either the arm 92 or 93, will shift the lever, 73, to neutral position; and when the platform in moving downwardly, reaches normal position, the shifting arm, 91, serves to neutralize the sliding clutch member.

When a wagon is driven upon the platform, the wagon wheel stop controlling lever, 31, is thrown forwardly to lift the associated stops, 23, to operative position and simultaneously places the shifting arm, 92, in engagement with the shaft, 84.

When the shifting lever, 73, assumes its neutral position, it is clear that the associated linkage shifts the manual lever, 76, to neutral position, displacement of which is prevented by virtue of engagement of the detent, 79, with a notch, 104, in the quadrant.

Figure 6:
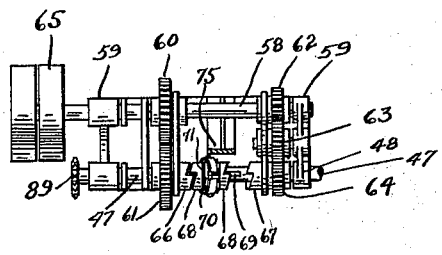
Fig. 6 is a plan of the jack power transmission.
Figure 5:
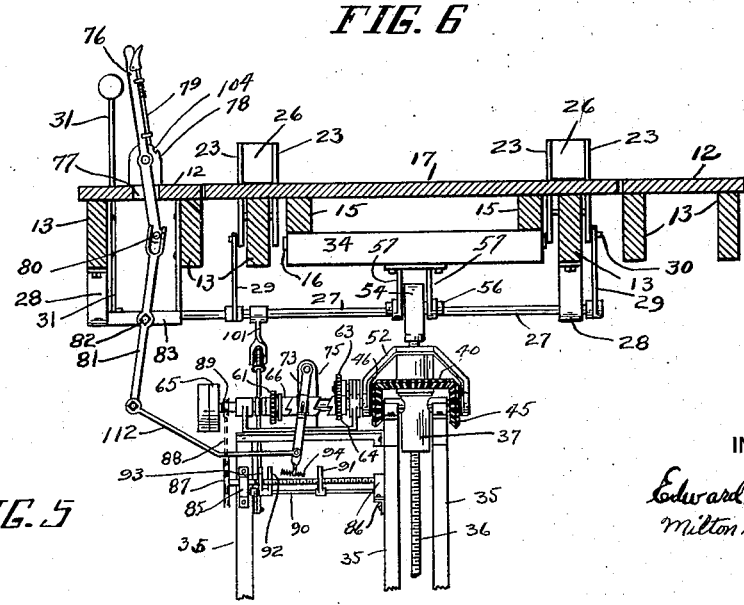
Fig. 5 is a transverse vertical section of the same taken on the line 5—5 of Fig. 4.

Then when the hand lever, 76, is shifted to the position shown in Fig. 6, the clutch member, 68, will be engaged with the companion member, 66, and the power transmission then co-acts with the jack shaft to move the tilting platform upwardly and when the platform has reached its lower inclined position, as indicated by dotted lines in Fig. 1, the shifting arm, 92, will have thrown the levers, 73 and 76, to neutral position. Obviously, the jack shaft positively supports the platform in the tilted position. The hand lever, 76, being shifted in the direction of the tilting platform places the clutch members, 68, in engagement with the adjacent clutch members, 67, whereupon the jack shaft is rotated in the opposite direction permitting the platform to gradually gravitate and as the platform assumes its normal position, the shifting arm, 91, serves to disengage the clutch members, 67 and 68 and the operating levers are again in their normal position.

By throwing the controlling lever, 31, rearwardly the stops, 23, are restored to normal, the arm 92, is thrown from the shaft, 84, and the arm, 93, placed in engagement with said shaft.

With the truck upon the platform, the truck wheel block controlling lever, 31, is thrown forwardly to place the associated stops in position for engagement by the truck wheels. The hand lever, 76, is then shifted from the tilting platform to place the clutch members, 66 and 68, in engagement to raise the platform as previously set forth. Then as the platform reaches its higher inclination, the arm, 93, throws the levers, 73 and 76, to neutral position to deënergize the transmission, the lever, 76, is then shifted toward the platform, as described with respect to dumping the wagons.

The modification of the power transmission presented in Fig. 11, consists of the main shaft, 105, driven from any suitable source of power and carrying drive pulleys, 106, and 107, the former connected by a cross belt, 108, with a pulley, 109, free on the counter shaft, 47, and carrying on its face, the clutch member, 67, and the latter connected by a straight belt, 110, with a pulley, 111, freely mounted on the counter shaft 47, and carrying on its face, the clutch member, 66. Between the said clutch members, is positioned the clutch member, 68, which is mounted, operates and co-acts with the adjacent clutch members in the same manner, as set forth with reference to the other views.

Having thus described our invention what we claim as new and desire to secure by Letters Patent of the United States, is,—

1. A vehicle-dump embodying vehicle-supporting means movable to and between normal and two other positions to accordingly move a vehicle to and between its normal and two different inclined positions, actuating mechanism for said means, mechanism for preselecting the one of said positions to which said means is to be moved, and means governed by the preselecting mechanism for deënergizing the actuating mechanism when said first means has reached the preselected position.

2. A vehicle-dump embodying a vehicle-supporting platform movable to and between horizontal and two different inclined positions to accordingly move a vehicle to and between its normal and two differently inclined positions, hoisting mechanism for operating the platform, mechanism for selecting the one of said positions to which the platform is to be moved, and means controlled by the selecting mechanism for deënergizing the hoisting mechanism when the platform has reached a preselected position.

3. A vehicle-dump embodying a vehicle-supporting platform, movable to and between different vertical positions to accordingly move a vehicle to and between two different inclined positions, hoisting mechanism for operating the platform, driving means for the hoisting mechanism, and means coacting with the driving means for preselecting the position to which the platform is to be moved and deënergizing the driving means when the platform has reached a preselected position.

4. A vehicle-dump embodying a vehicle-tilting means, and an actuating jack therefor, including a suitable support, a threaded jack-shaft, a guide for the shaft carried by the support, a gear threaded on the shaft and carried by the guide, and means for driving the gear.

5. A vehicle-dump embodying a vehicle-tilting means, and an actuating jack therefor, including a suitable support, a threaded jack-shaft, to raise and lower the platform to and between an inclined and its normal position, a guide for the shaft on the support, a gear threaded on the shaft and carried by the guide, driving mechanism for the gear, and means for automatically de-energizing the driving mechanism when the platform reaches either of said positions.

In testimony whereof we have hereunto set our hands this 2nd day of October, 1919.

EDWARD R. BENSON.
MILTON S. CRANDALL.